(12) United States Patent
Miller et al.

(10) Patent No.: US 6,880,550 B2
(45) Date of Patent: Apr. 19, 2005

(54) FOOD AND BEVERAGE CONTAINER

(76) Inventors: Roy Kevin Miller, 20 12$^{th}$ Road. Kew. 2090, Johannesburg, Gauteng (ZA); Francisco Almoguera, 20 12$^{th}$ Road. Kew. 2090, Johannesburg, Gauteng (ZA)

( * ) Notice: Subject to any disclaimer, the term of this patent is extended or adjusted under 35 U.S.C. 154(b) by 117 days.

(21) Appl. No.: 10/296,872

(22) PCT Filed: May 29, 2001

(86) PCT No.: PCT/ZA01/00069

§ 371 (c)(1),
(2), (4) Date: Nov. 27, 2002

(87) PCT Pub. No.: WO01/92128

PCT Pub. Date: Dec. 6, 2001

(65) Prior Publication Data

US 2004/0224057 A1 Nov. 11, 2004

(30) Foreign Application Priority Data

May 29, 2000 (ZA) .......................... 2000/1268

(51) Int. Cl.$^7$ ................................. F24J 1/00
(52) U.S. Cl. .................. 126/263.09; 126/262; 206/222
(58) Field of Search ................ 126/263.09, 263.08, 126/263.07, 263.06, 253.05, 262; 62/4, 294; 206/219, 222; 426/113; 64/4, 294

(56) References Cited

U.S. PATENT DOCUMENTS

| 654,174 A | * | 7/1900 | Murmann et al. ..... 126/263.08 |
| 2,300,793 A | * | 11/1942 | Martin ................... 126/263.08 |
| 3,683,889 A | | 8/1972 | Hoffman |
| 4,793,323 A | * | 12/1988 | Guida et al. ........... 126/263.08 |
| 5,255,812 A | * | 10/1993 | Hsu ....................... 126/263.01 |
| 5,626,022 A | * | 5/1997 | Scudder et al. ........ 126/263.01 |
| 6,029,651 A | * | 2/2000 | Dorney .................. 126/263.07 |
| 6,079,405 A | | 6/2000 | Justo |
| 6,338,252 B1 | * | 1/2002 | Calderaio .............. 126/263.08 |

FOREIGN PATENT DOCUMENTS

| EP | 0 344 541 | 12/1989 | |
| JP | 02180222 | 7/1990 | |
| JP | 7-75616 A | * 3/1995 | .............. F24J/1/00 |

* cited by examiner

*Primary Examiner*—Josiah C. Cocks
(74) *Attorney, Agent, or Firm*—Keusey, Tutunjian & Bitetto, P.C.

(57) ABSTRACT

A food or beverage container includes a receptacle and an assembly for generating a change in temperature. The assembly includes two reactive components in a housing and which are separated from each other by a frangible member within the receptacle. The receptacle includes a wall with a movable portion and which opposes a movable part of a housing wall, and means for transmitting movement of the movable portion to the movable part of the housing wall. A liquid is disposed inside the receptacle and at least partly surrounds the housing.

9 Claims, 4 Drawing Sheets

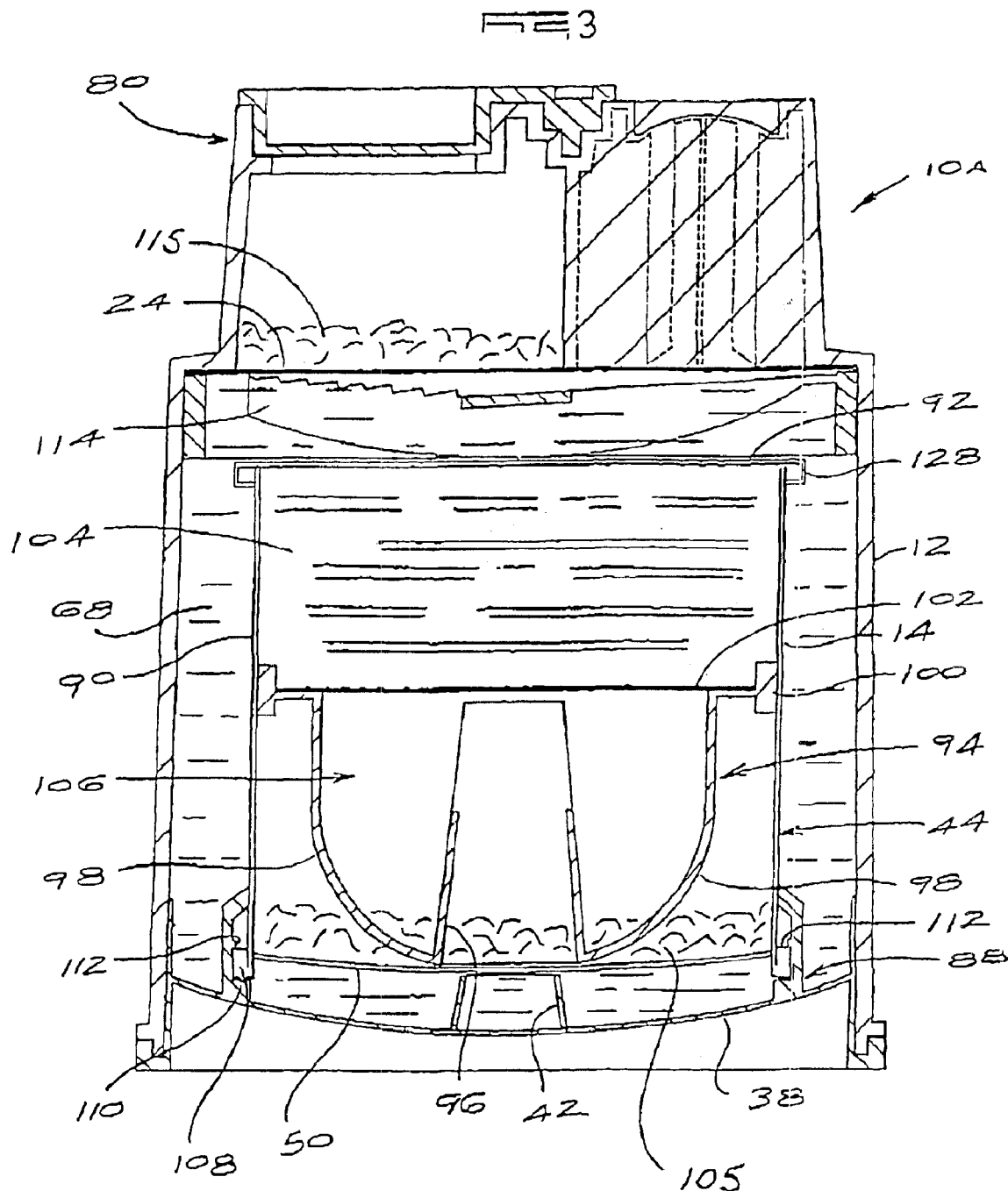

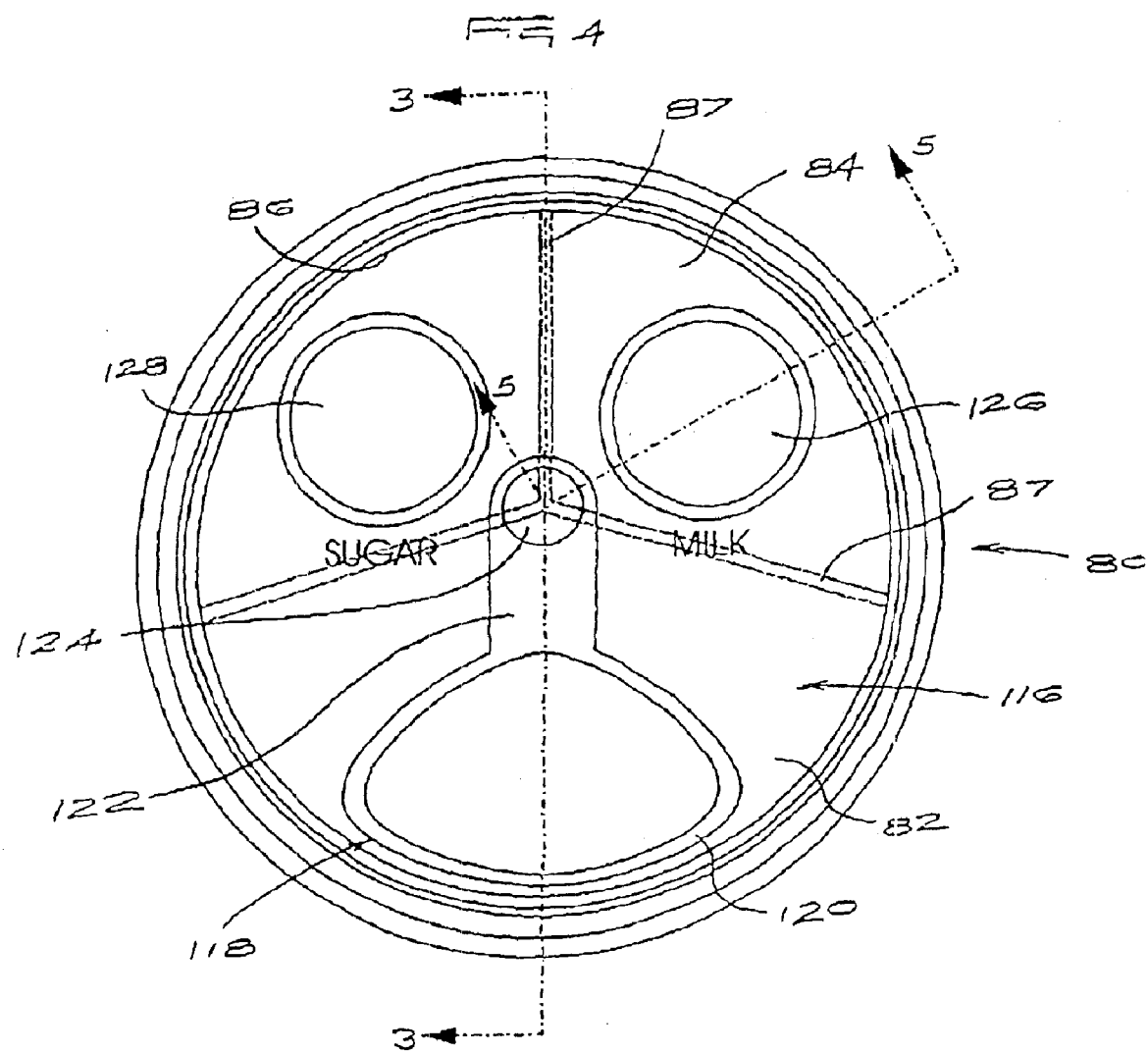
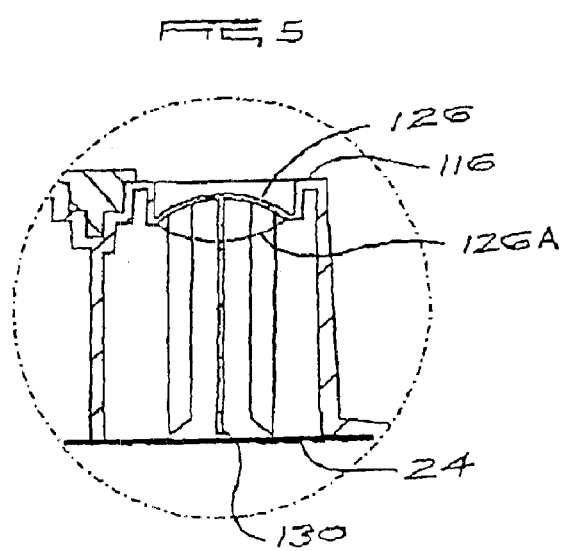

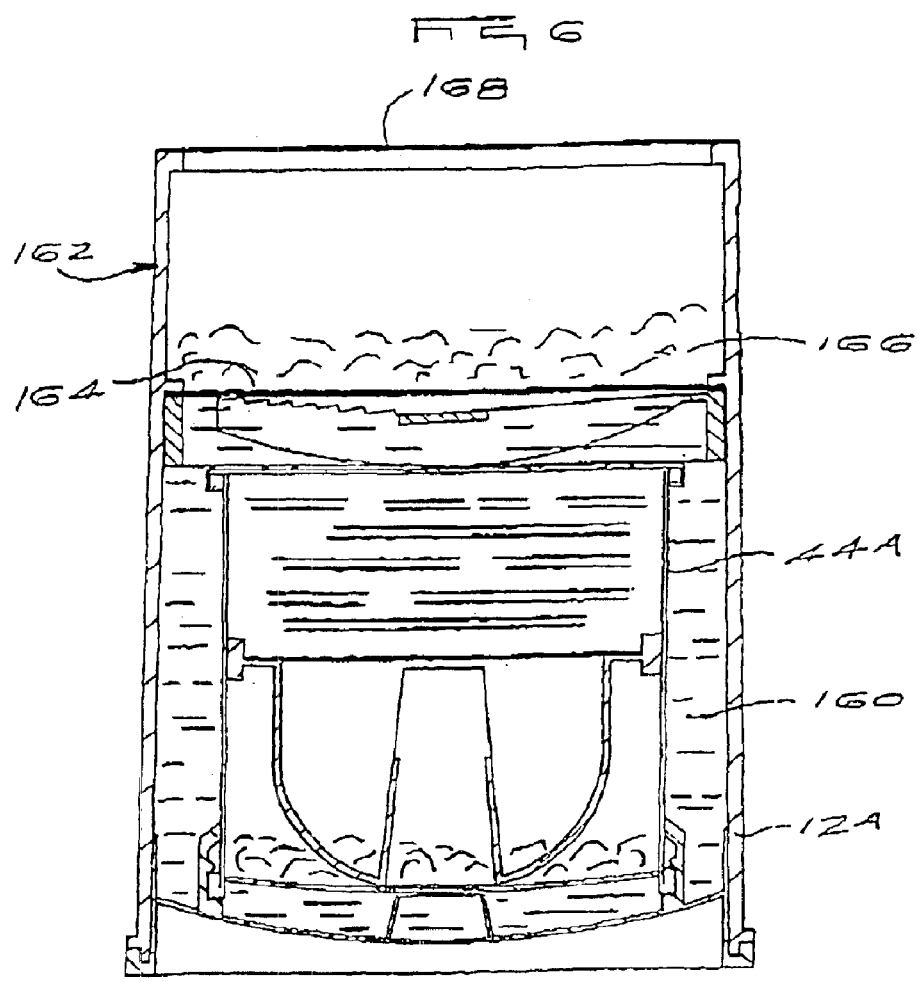
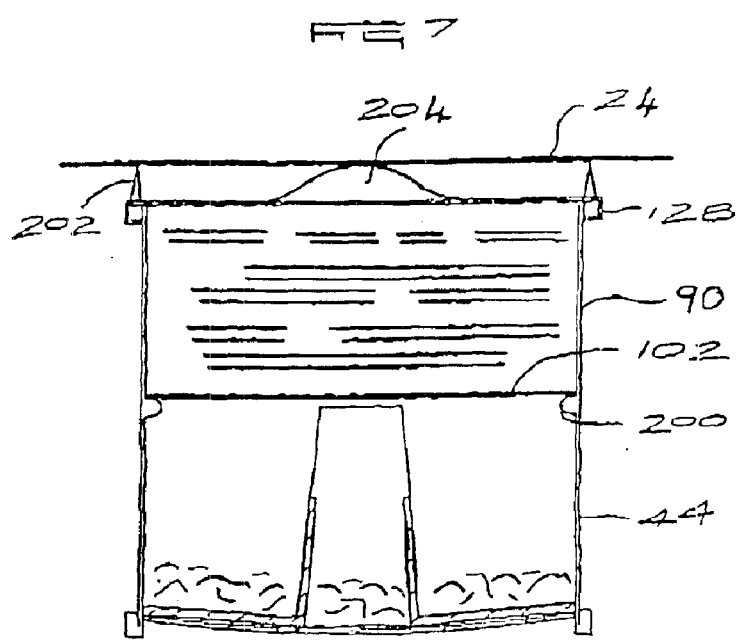

FOOD AND BEVERAGE CONTAINER

BACKGROUND OF THE INVENTION

This invention relates to a container which is suitable for use with a food or beverage and which can be used in a convenient and easy manner for preparing or making the food or beverage warmer or cooler.

Various compound devices, which contain a packaged assembly of food or beverage, and a temperature altering arrangement, have been proposed for heating and warming food or beverage. To the applicant's knowledge such devices which generate heat, or which exhibit a cooling effect, suffer from disadvantages which include difficulty in fabricating and packing or filling containers, the wastage of energy due to the fact that an energy source, which heats or cools the food or beverage, is not totally enveloped in the food or beverage, and the complexity of construction.

SUMMARY OF THE INVENTION

The invention is concerned with an assembly, and with a container, which at least partly address the aforementioned problems.

The invention provides, in the first instance, an assembly for generating a change in temperature which includes a housing with a wall, at least part of the wall being movable, at least two reactive components inside the housing which are separated from each other by at least one frangible member, and a device inside the housing which is movable by moving at least part of the wall to break the frangible member and thereby allow the components to react with each other.

The wall may be moved by flexing the wall.

The housing is preferably metallic. The housing may include a cylindrical body with opposed ends. Each end may be in the nature of a lid which is sealed to the body.

In a preferred form of the invention one lid, ie. an end of the housing, is domed outwardly and is flexible inwardly. Upon being flexed inwardly the lid acts on the device and causes it to break the frangible member.

An opposed end or lid of the housing may be inwardly extending, for example domed inwardly, and may be flexible outwardly as pressure is generated inside the housing by the components which react with each other. On the other hand if the nature of the reaction inside the housing is such that pressure inside the housing is reduced then the said opposed lid may extend outwardly so that it then flexes inwardly as the pressure in the housing decreases.

The frangible member may be of any suitable shape or size. In one example of the invention the frangible member is a diaphragm or similar device which forms a partition between the two reactive components. The frangible member may, in this form of the invention, be attached to an inner surface of the wall of the housing.

In an alternative form of the invention the frangible member is formed by, or directly forms, an enclosure for at least one of the components. The frangible member may for example be a sachet in which one component is packaged. It is possible to package both components in separate sachets and position the sachets inside the housing.

The components may be used to generate a cooling effect and in this regard the components may comprise materials which are known in the art. For example it is known that ammonium nitrate, when mixed with water, causes a reduction in temperature. Alternatively the assembly is used for generating an increase in temperature and, in this case, the components which react with each other may, for example, be calcium or lime, and water. In this example of the invention the calcium or the water or both may be packaged in respective sachets.

The said device inside the housing which is used for breaking the frangible member is preferably loose inside the housing in the sense that it is not attached to a wall of the housing but, instead, is simply contained inside the housing.

The invention extends, in the second instance, to a food or beverage container which includes a receptacle, an assembly of the aforementioned kind inside the receptacle, the receptacle including a wall with a movable portion which opposes the said movable part of the wall of the housing of the assembly, a liquid inside the receptacle which at least partly surrounds the said housing, and means for transmitting movement of the said flexible portion to the said movable part of the wall of the housing.

Preferably the wall portion is flexible.

The container may include a diaphragm which is fixed to an inner surface of the receptacle and which forms at least part of at least one sealed compartment which contains an ingredient which is intended to be mixed with the liquid. The said assembly may be positioned so that when its lid or wall which extends inwardly is moved outwardly the diaphragm is caused to be broken or fractured and the ingredient is mixed with the liquid inside the receptacle.

Alternatively the assembly, or at least the housing, may be movable thereby to cause the diaphragm to be broken or fractured. A suitable component may be positioned between the diaphragm and the housing to achieve this effect or a surface of the housing may be shaped and positioned to achieve this effect (ie. breaking the diaphragm).

The container may include a dispensing aperture in the nature of a spout or an orifice which is designed to be engaged with a teat, depending on the application. The dispensing aperture may be sealed by means of a removable cover.

The container may include a plurality of sealed compartments which respectively house different ingredients and which are selectively accessible or breakable to allow a chosen ingredient or ingredients to be added to the liquid.

The ingredients may vary according to requirement and may be selected (by way of example only) to meet particular requirements, from the following: tea, coffee, cocoa, chocolate, soup powder, salt, pepper, sugar, milk, etc.

The invention further extends to a method of packaging a container which includes the steps of placing an ingredient inside the container, sealing the ingredient inside the container by means of a diaphragm which is attached to an inner wall of the container, placing an assembly for generating a change in temperature inside the container above the diaphragm, locating the assembly correctly inside the container by means of a spacing device, filling the container above the diaphragm with a liquid which surrounds the assembly, engaging a lid with the container and sealing the lid to the container.

The aforementioned process is preferably carried out without altering the orientation of the container.

BRIEF DESCRIPTION OF THE DRAWINGS

The invention is further described by way of examples with reference to the accompanying drawings in which:

FIG. 3 is a cross sectional side view of a container according to a second form of the invention, FIG. 4 is a plan view of the container of FIG. 3, FIG. 5 is an enlarged side view of a portion of the container of FIG. 3, FIG. 6 is a cross sectional side view of a container according to another form of the invention, and FIG. 7 shows certain variations of the invention.

DESCRIPTION OF PREFERRED EMBODIMENTS

Figure 1:
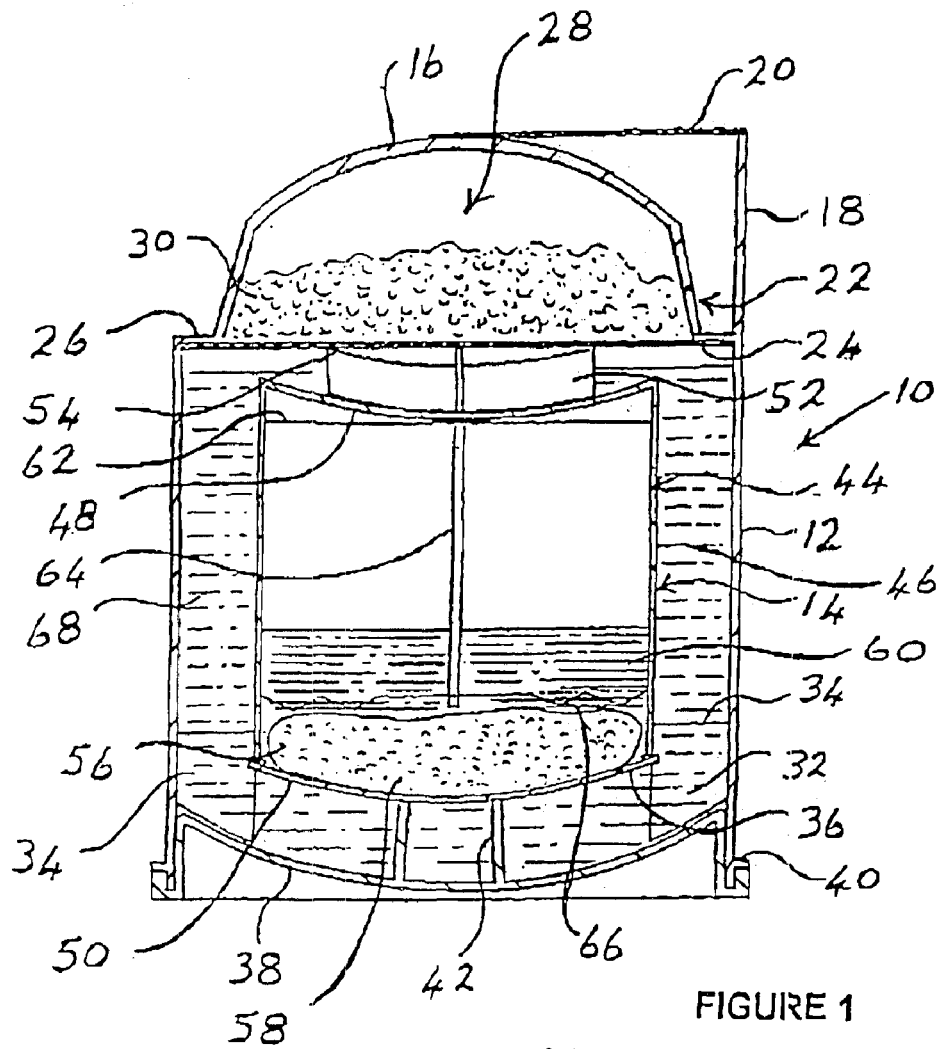
FIG. 1 is a side view in section of a food or beverage container according to the invention.
Figure 2:
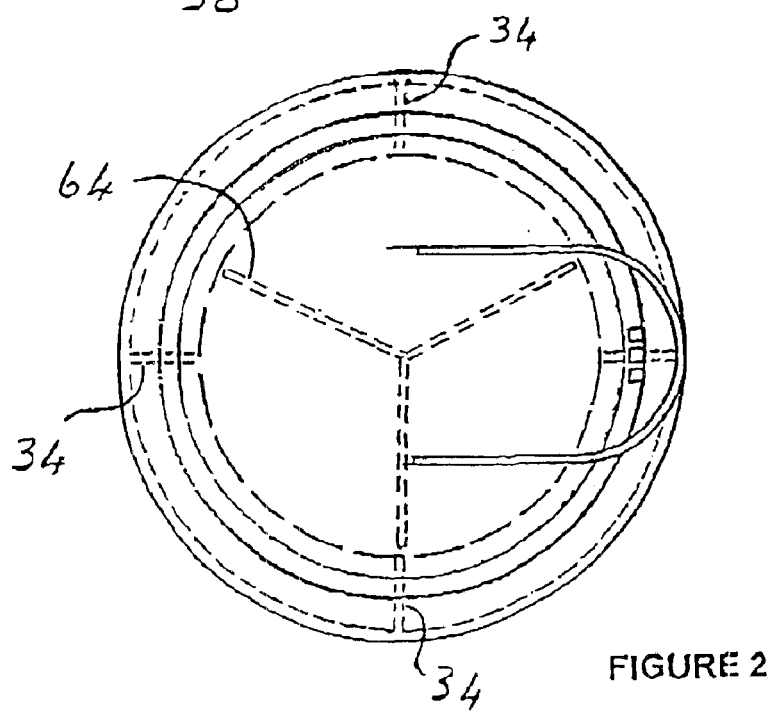
FIG. 2 is a plan view of the container of FIG. 1.

FIGS. 1 and 2 illustrate a container 10 according to a first form of the invention which is designed for providing a food or beverage, at a desired temperature, upon demand. The invention is described hereinafter with reference to the provision of a beverage at an elevated temperature but it is to be understood that any appropriate food can be provided at an elevated temperature or that a food or beverage, according to requirement, can be provided at a relatively cooler temperature.

The container 10 includes a receptacle 12 which is made from a suitable plastics material and an assembly 14 which is positioned inside the receptacle.

The receptacle has a domed upper end 16 which is formed, on one side, with a dispensing aperture 18 which is in the nature of a drinking spout. A removable cover 20 eg. of foil or a plastics material, is adhesively attached to a mouth of the aperture. A wall of the upper end 16, which bounds a portion of the spout, is formed with a number of holes 22.

A sheet material diaphragm 24 which is made for example from aluminium foil or a plastics material is adhesively fixed at its periphery to an internal shoulder 26 of the receptacle. A seated compartment 28 is thereby defined inside the upper region of the receptacle. A granular food ingredient 30 for example in the nature of coffee granules is positioned inside the compartment.

The assembly 14, which is further described hereinafter, rests on a spacing device 32 which has four ribs 34 at right angles to each other which are suitably shaped to engage with a rim 36 on the assembly. The ribs extend from a domed lid 38 which is sealingly engaged at its periphery, for example by means of ultrasonic welding, to a flange 40 on the receptacle. A cylindrical formation 42 on an inner surface of the lid 38 abuts an underside of the assembly 14.

The assembly 14 includes a metallic housing 44 which is in the nature of a tin can. The housing has a cylindrical wall 46 with an inwardly domed upper lid 48 and an outwardly domed lower lid 50 which rests on the formation 42. A moulded plastic insert 52 with a sharpened upper end 54 rests on the upper lid 48 opposing the underside of the diaphragm 24.

A sachet 56 which is pre-packaged with water 58 is inside the housing 44. Granular, calcium 60 rests on the sachet. A device 62 which is made from a hard plastic material is also positioned inside the housing. The device has flanges 64 which position it inside the housing and which prevent it from moving sideways relatively to the housing. The device is not attached to an inner surface of the housing and a lower pointed 66 end rests on the sachet 56.

Water 68 fills the receptacle 12 and surrounds the assembly 14.

The container 10 is packaged with its contents in the following way. The container initially is empty and the lid 38 is not engaged with the container. The container is turned through 180° so that the open end adjacent the flange 40, which forms a mouth to the container, is uppermost. The cover 20 is previously attached to the dispensing aperture 18 in any appropriate way using techniques which are known in the art.

On an assembly line the container is moved passed a plurality of stations. At a first station the granular coffee 30 is placed through the mouth into the container in a desired quantity. The diaphragm 24 is then sealingly engaged with the shoulder 26. The assembly 14, which is preformed, is placed together with the spacing device 32 inside the receptacle at a following station. Movement of the receptacle along the assembly line brings the receptacle to a filling station at which water 68 is placed inside the receptacle whereafter, at a final station, the lid 38 is engaged with the flange 40 and is fixed thereto by means of ultrasonic welding.

As has been indicated the assembly 14 is prepackaged and preformed. Use is made, for example, of a small tin can which is suitably coated on inner and outer surfaces so that it is non-contaminating and rust resistant. The prepackaged sachet of water 56 is placed in the can and the device 62 is positioned over the sachet. A predetermined quantity of calcium granules 60 is placed inside the housing 44 whereafter the domed upper lid 48 is engaged with the housing 44 and is sealingly fixed thereto using techniques which are known in the art.

It is pointed out that the domed lids 48 and 50 of the assembly 14 are metallic but are highly flexible. Another aspect which is to be noted is that the water 68 totally surrounds the metallic assembly 14.

For the given example, when hot coffee is required, a user presses on the lower domed lid 38. The lid is capable of flexing inwardly and the formation 42, which is an integral part of the lid, bears against the outwardly domed lower lid 50 of the assembly 14 and thereby pushes the lid 50 inwardly. As has been pointed out the lid 50 is capable of flexing inwardly, The inwards movement of the lid causes the device 62 to press against the sachet 56 and the flexible wall of the sachet is fractured by the device. The water in the sachet is released and contacts the calcium granules 60 reacting therewith almost instantaneously. The reaction gives rise to heat and pressure inside the housing 44 which is totally sealed. The increase in pressure causes the upper inwardly domed lid 48 to flex outwardly and the member 52 is thereby forced against the diaphragm 24. The sharp end 54 of the member fractures the diaphragm and the water 68, inside the receptacle, which is being warmed by the heat which is released by the chemical reaction inside the housing 44, can therefore mix with the coffee granules 30. In a short space of time a warm coffee mixture is prepared. This process ie. the mixing of the coffee and the heat transfer to the coffee can be expedited by shaking the container 10. The user can then remove the cover 20 an drink from the dispensing aperture 18 with coffee flowing through the holes 22.

The heat which is released by the assembly 14 is effectively transmitted to the water 68. This is attributable to two factors namely, that the housing 44 is made from a heat conducting material i.e. a metal and, secondly, that the water totally surrounds the housing. No portion of the housing 44 is exposed to atmosphere nor is it possible for a portion of the housing to be contacted directly by a hand of a user.

In a variation of the invention when the lid 36 is pushed inwardly there are two consequences, namely the sachet 56 is fractured in the manner described and heat is thereby generated in the resulting reaction and, secondly, the entire housing 44 is moved upwardly so that the movement of the housing causes the diaphragm 24 to be broken. In other words it is not necessary to wait for the pressure which is exerted inside the housing to build up to a level which is sufficient to cause the inwardly domed upper end 48 to be flexed outwardly.

The invention has been described with reference to the preparation of a beverage such as coffee. Clearly this is not limiting and has been given only by way of example. Any other beverage or food mixture can be prepared. One composition is the preparation of milk for an infant from a milk formula which is used in place of the coffee and which is mixed with water, in the manner described. A teat, not shown, is held inside the spout and when the cover 20 is removed the teat can be extracted from the spout and engaged with a suitable formation, provided for the purpose, on the spout so that an infant can drink through the teat. Variations of this kind are intended to fall within the scope of present invention.

It is to be understood that any number of ribs 34 may be used to support the assembly.

It is further to be understood that the invention is not limited to the use of a metallic housing 44 and any suitable material which allows sufficient heat transfer and flexibility such as polypropylene or acetal may be used.

FIGS. 3, 4 and 5 illustrate a container 10A according to a second form of the invention. In many respects the container 10A is similar to the container 10 and thus, where applicable, the same reference numerals are used in connection with the container 10A, as are used in connection with the container 10, to designate similar components.

The container 10A includes a receptacle 12 in which is mounted a housing 44. A diaphragm or aluminum foil sheet 24 extends over the interior of the receptacle 12 some distance above an upper end of the housing 44. A section of the receptacle 12, designated 80, defines three compartments 82, 84 and 86 respectively, divided from each other by partitions 87 shown in dotted outline in FIG. 4.

The receptacle 12 has a lower base or lid 38 which is domed outwardly and which is flexible. The housing 44 is positioned on supports 88 which extend from the base 38. The housing has a downwardly facing flexible and preferably domed lower lid 50.

The housing 44 is essentially a can with a wall 90, the lower lid 50 which, as noted, is flexible, and an upper lid or seal 92. In this case the upper lid 92 is not necessarily flexible as is the case with the embodiment shown in FIG. 1.

A shaped plastic insert 94 is located inside the can or housing 44. The insert has a central slightly tapered tubular formation 96 which rests on an inner upper surface of the lower lid 50 and a number of arms 98 which curve outwardly and upwardly from a base of the formation 96. A ring 100 is engaged with upper ends of the arms 98 and supports a diaphragm or foil 102. The ring 100 is engaged in a leak-proof manner with an inner surface of the wall 90 and together with the foil 102 divides the interior of the can 44 into an upper compartment 104 which is filled with water and a lower compartment 106 which contains calcium 105.

A rim 108 of the can 44 rests on formations 110 on the supports 88. A small ridge 112 on each support abuts the rim 108 and ensures that at least initially the can is restrained from being moved in a vertical sense. The upper lid 92 bears against a plastic component 114 which has a number of serrations which underlie the diaphragm or foil 24.

In this example of the invention the compartment 82 in the upper section of the receptacle 12 contains coffee granules. An upper surface 116 of the receptacle is formed with a mouth 118 which opens into the compartment 82. A cover plate 120 normally seals the mouth. The cover plate is engaged with the mouth with a snap-fit and can be disengaged from the mouth when required. The cover plate extends from a projection 122 which is fixed with a swivel or pivot connection 124 to a centre point of the cover plate 120. Two small domed and flexible buttons 126 and 128 respectively are provided in the cover plate 120 over the compartments 84 and 86 respectively. These compartments respectively contain powdered milk and sugar in appropriate quantities.

FIG. 5 shows one of the buttons 126 in cross section. The button is made from thin plastics material and is integrally moulded with the cover plate. Three spaced spike formations 130 depend downwardly from an inner surface of the button and are positioned slightly above the diaphragm or foil 24 which separates the upper section 80 from the lower portion of the receptacle.

As is the case with the FIG. 1 embodiment water 68 fills the receptacle 12 and surrounds the tin 44 essentially providing a water jacket for the tin.

The container 10A may be packaged generally in the same way as what has been described in connection with the container 10.

When a user wishes to prepare a hot coffee drink the base 38, which as noted is flexible, is pushed upwardly towards the interior of the receptacle 12. The lower lid 50 is thereby urged towards the interior of the can 44. The formation 96 which has a pointed upper end is moved upwardly and penetrates the foil diaphragm 102 thereby allowing water from the compartment 104 to enter the lower compartment 106 and mix with the calcium contained therein. Heat is thereby generated which raises the temperature of the water 68 in the jacket surrounding the tin 44.

As an alternative to the ring 100 which is supported on the arms 98 it is possible, as is shown in FIG. 7, to form the wall 90 of the can with an inwardly extending ridge 200 to which the foil 102 is directly fixed. This reduces the cost of construction of the heating assembly.

When an upwardly directed force is exerted via the base 38 on the can 44 the ridges 112 initially prevent movement of the tin for they abut the rim 108. As the degree of force is increased the rim distorts the ridges 112 and the can then rises to a maximum extent. The upwardly moving can bears against the plastic component 114 and the foil 24 Which divides the compartment 82, which contains the coffee, from the water jacket around the can 44 is severed thereby allowing the coffee granules to be mixed with the water.

In a variation of the invention, shown schematically in FIG. 7, the can 44 is formed on its upper rim 128 with upwardly extending formations 202, or its upper lid 92 has an outwardly projecting formation 204. The formations 202 or formation 204, as the case may be, bears against the underside of the diaphragm 24 and when the can is moved upwardly the diaphragm is punctured, allowing mixing of the can's ingredients to take place. This approach allows a component 114 of the assembly to be eliminated.

The aforementioned procedures thus cause the water around the can to be heated and secondly allow the water to be mixed with coffee granules thereby creating a hot coffee drink.

If a user wishes to drink the coffee then the cover plate 120 is pulled upwardly away from the mouth 118 and pivoted to one side. The user then drinks from the mouth 118. The cover plate can be re-engaged with the mouth, when required, to seal any remaining coffee, within the container.

If the user wishes to have milk or sugar then the appropriate button 126 or 128 is depressed. When this happens the downwardly depending spike formations 130, shown in FIG. 5, penetrate the respective portion of the foil diaphragm 24 and the contents of the respective compartment 84 or 86 as the case may be can then be mixed with the hot coffee.

The flexible button 126 (or 128) is constructed in such a way that a fair amount of energy is needed to depress the button from the position shown in FIG. 1 to a lower dotted line position 126A shown in FIG. 5 at which the spike formations 130 fully penetrate the foil 124. When the button is depressed in this way it is not able, due to its own resilience, to rise upwardly to its initial position. This feature therefore provides an indication of whether the container 10A has been tampered with.

The embodiment of the invention shown in FIGS. 3 to 5 thus allows for the production, almost instantaneously, of hot coffee with milk or sugar, or both, as desired.

It has been found through experimentation that the calcium/water mixture inside the tin has a high specific heat and once these ingredients are mixed the water in the jacket around the tin, or the prepared coffee, as the case may be, stays hot for a considerable period.

The principles which have been described can be used with equal effect for the production of other hot drinks such as chocolate, cocoa, soup or the like.

If the calcium in the lower compartment 106 is replaced by ammonium nitrate then when water is added to the ammonium nitrate the resulting reaction will lower the temperature of the water in the jacket around the can. This can be used to cool a beverage which can be premixed or which can be mixed when required, by breaking the diaphragm 24 to allow an appropriate ingredient to be mixed with the water in the jacket.

FIG. 6 shows a third embodiment of the invention, designated 10B, which is particularly suitable for producing hot drink such as soup. A heat generating assembly 44A, which is similar to what has been described in connection with FIG. 3, is located inside a receptacle 12A. The assembly 44A is not described in detail for it functions essentially in the way which has already been elaborated on. Water 160 surrounds the assembly 44A and is separated from an upper compartment 162 by means of a foil diaphragm 164. Powered soup 166 is positioned in the compartment 162 and is sealed in the compartment by means of a removable seal or lid 168.

When soup is to be prepared the assembly 44A is activated in the manner which has been described and the water 160 is heated. At the same time the diaphragm 164 is perforated and the soup powder is allowed to mix with the water. Once mixing and heating have taken place to a required extent, and as noted this can be expedited by shaking the container, the seal or lid 168 is removed and the user can drink directly from the container, as if it were a cup.

What is claimed is:

1. An assembly for generating a change in temperature comprising:
    a housing having a cylindrical body with opposing ends, wherein at least one of said housing ends is outwardly domed and inwardly flexible, wherein said housing is not integrally attached to another housing;
    at least two reactive components inside said housing;
    at least one frangible member separating said at least two reactive components from each other;
    a device disposed in said housing for breaking the frangible member and thereby enabling the components to react with each other, wherein inward flexing of said domed end causes said device to break said frangible member;
    a food or beverage container including a receptacle having a wall with a movable portion opposing said domed end, and means for transmitting movement of said movable portion to said domed end, wherein the assembly generates a temperature change within said receptacle; and
    a liquid inside said receptacle and in contact with the assembly.

2. The assembly according to claim 1, wherein said housing is metallic.

3. The assembly according to claim 1, wherein said frangible member comprises a diaphragm forming a partition between the two reactive components.

4. The assembly according to claim 1, wherein said reactive components comprise water and one of either calcium or aminonium nitrate.

5. The assembly according to claim 1, further comprising a diaphragm fixed to an inner surface of said receptacle and which forms at least part of at least one sealed compartment, wherein each of said at least one sealed compartment contains a respective ingredient intended to be mixed with said liquid.

6. The assembly according to claim 5, wherein said housing is movable inside said receptacle to cause said diaphragm to be broken.

7. The assembly according to claim 1, wherein said container further comprises a plurality of sealed compartments which respectively house different ingredients, said compartments being selectively accessible and/or breakable to allow a chosen one or more ingredients to be added to the liquid.

8. The assembly according to claim 7, wherein the ingredients comprise at least one selected from a group consisting of tea, coca, chocolate, soup powder, salt, pepper and sugar.

9. The assembly according to claim 1, wherein said liquid inside said receptacle completely surrounds said housing.

* * * * *